May 3, 1966     C. F. QUICK     3,248,813
STEAM IRON Filed Feb. 16, 1962     5 Sheets-Sheet 1

INVENTOR.
CARL F. QUICK
BY
Gravely, Lieder & Woodruff
ATTORNEYS

May 3, 1966  C. F. QUICK  3,248,813
STEAM IRON
Filed Feb. 16, 1962  5 Sheets-Sheet 2

INVENTOR.
CARL F. QUICK
BY
Gravely, Lieder & Woodruff
ATTORNEYS

May 3, 1966 C. F. QUICK 3,248,813
STEAM IRON

Filed Feb. 16, 1962 5 Sheets-Sheet 3

INVENTOR.
CARL F. QUICK
BY
Gravely, Lieder & Woodruff
ATTORNEYS

May 3, 1966  C. F. QUICK  3,248,813
STEAM IRON

Filed Feb. 16, 1962  5 Sheets-Sheet 4

INVENTOR.
CARL F. QUICK
BY
*Gravely, Lieder & Woodruff*
ATTORNEYS

May 3, 1966  C. F. QUICK  3,248,813
STEAM IRON

Filed Feb. 16, 1962  5 Sheets-Sheet 5

INVENTOR.
CARL F. QUICK
BY
Gravely, Lieder & Woodruff
ATTORNEYS 3,248,813
STEAM IRON
Carl F. Quick, 46 Green Acres, Bellefontaine
Neighbors 37, Mo.
Filed Feb. 16, 1962, Ser. No. 173,686
11 Claims. (Cl. 38—77)

The present invention relates to flat irons, and in particular, relates to flat irons having self-contained heating units, preferably electrical, provided with means for supplying live steam through the face of the iron to the fabric which is being operated upon.

It is one of the principal objects of the present invention to provide a diffuser or filter between the steam source and a steam cavity within the base section of the iron to break up droplets of moisture in the steam into minute particles which flash, upon passing through the filter, due to a pressure drop across the filter. This porous diffuser preferably is located in the iron base member cavity on the down stream side of an expansion chamber and condensation trap, and preferably directly under the heating element to maintain the diffuser temperature at a sufficiently high level to facilitate the flashing process of moisture sticking to its surface and passing through it.

Another object of the present invention is to provide a steam iron including a two piece base section or sole plate having steam cavities therein and steam outlets communicating the cavities and the undersurface of the iron, said steam outlets passing through raised bosses in the steam chambers so that condensation is collected within the steam chamber and vaporized by heat from the base member, thus preventing any minute condensation or moisture accumulation from passing through the outlets.

Another object of the present invention is to provide an iron wherein the thermostat makes and breaks its circuit approximately half the normal frequency, said iron incorporating a dielectric low thermal conductivity pressure plate between the heating element and the cover of the iron so as to minimize heat losses from the base section to the upper surface of the iron.

Still another object of the present invention is to provide a cover having spaced inlet and outlet vents whereby thermal turbulence from the heating element creates a sufficient flow of air through the inlet vent, into the cover chamber, and through the outlet vent to carry off the limited heat losses passing through the low thermal conductivity pressure plate which cools the chamber defined by the cover so that connections between the thermostat, the heating element, and an electrical source can be made directly within the chamber.

Still another object of the present invention is to provide a handle for a steam iron having an integral water conduit with fittings on each end thereof; one of said fittings being adapted to be connected to a water source and the other being adapted to mount a spray head so that the flow of water through the conduit to the spray head cools the handle.

Another object is to provide a steam conduit constructed of suitable cured polymeric materials, such as; tetra-fluoroethylene (Teflon), chlorosulfonated polyethylene (Hypalon) or co-polymers such as vinylidene fluoride and hexafluoro propylene (Viton), polyurethane (Adiprene), and the like, communicating a steam chest with the iron so that the flaking and breaking down of the normal rubber conduit is eliminated.

Still another object is to provide an iron rest having two sections one of which is adapted to retain the heat within the iron and the other of which is constructed to rapidly dissipate heat from the iron for speedy cooling thereof.

Still another object is to provide a thermostat control knob having a split bushing cast integrally therewith and adapted to engage a key connected to the thermostat setting screw in the split of the bushing with the knob being retained on the appliance by a split retaining ring.

Another object of the present invention is to provide an integral heating element and thermal and electrical insulator of sufficient mechanical strength to seat directly upon the sole plate of an iron.

Still another object is to provide a strip heating element recessed into the lower surface of a dielectric block of high thermal resistivity and seated upon an iron sole plate with a thin layer of an electrical insulating material interposed therebetween.

A further object is to provide an iron including a layer of low temperature curing ceramic having a radiant heat barring substance incorporated therein positioned atop a heating element to reduce radiant heat losses from said heating element to the chamber defined by the cover of the iron.

Another object is to provide an iron construction adapted to utilize a steel heating element without said heating element being oxidized by excessive heat.

Another object is to provide an iron having a sole plate made of aluminum, titanium or beryllium with a hard dense anodized top surface and an electrical resistance heating element positioned in intimate contact with said anodic coated surface.

Still another object is to provide an iron having a printed electrical resistance heating circuit spaced from the sole plate by a thin layer of dielectric material.

These and other objects and advantages will become apparent hereinafter.

The present invention comprises a steam iron having a diffuser element positioned between the steam cavity and a steam source, the steam cavity being heated by the heating element of the iron, with a pressure drop across said diffuser to eliminate water droplets from the steam. The present invention further comprises a steam iron wherein a pressure plate of low thermal conductivity material is positioned between the heating element and a vented cover to reduce thermostat cycling and retain heat in the sole plate. The present invention further comprises a two piece sole plate, a thermostat knob and a one piece water cooled handle housing electrical conductors as hereinafter described and claimed. The present invention includes a sole plate having a thin anodic dielectric layer separating the top surface thereof from an economical heating element positioned in intimate contact with said layer of dielectric and covered by a plate of dielectric material having low thermal conductivity.

In the accompanying drawings, wherein like numbers refer to like parts whereinafter they occur.

Figure 1:
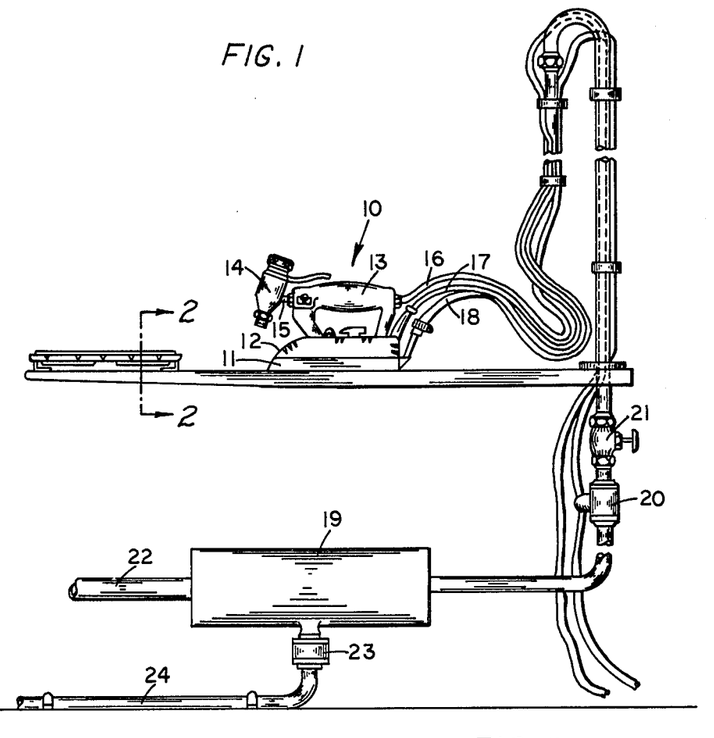
FIG. 1 is a side elevation of an iron involving the invention together with the accessories for supplying water, steam, the heating current and the iron rest.

FIG. 1 shows a flat iron 10 including a base section 11, a cover section 12, a handle 13 fitted to the cover section 12, a spray nozzle 14 connected by conduit 15 to the handle 13, a water conduit 16 connected to the other end of the handle 13 and to a water source (not shown), an electrical conductor 17, and a steam conduit 18 connected to the iron 10 and to a steam chest 19. A solenoid valve 20 controls operation of the steam from the steam chest 19 to the iron 10 and a pressure regulating valve 21 controls the pressure of said steam. A steam pipe 22 passes steam from a steam source (not shown) to the steam chest 19 and a trap 23 collects condensate which is passed out through a boiler return line 24.

Figure 3:
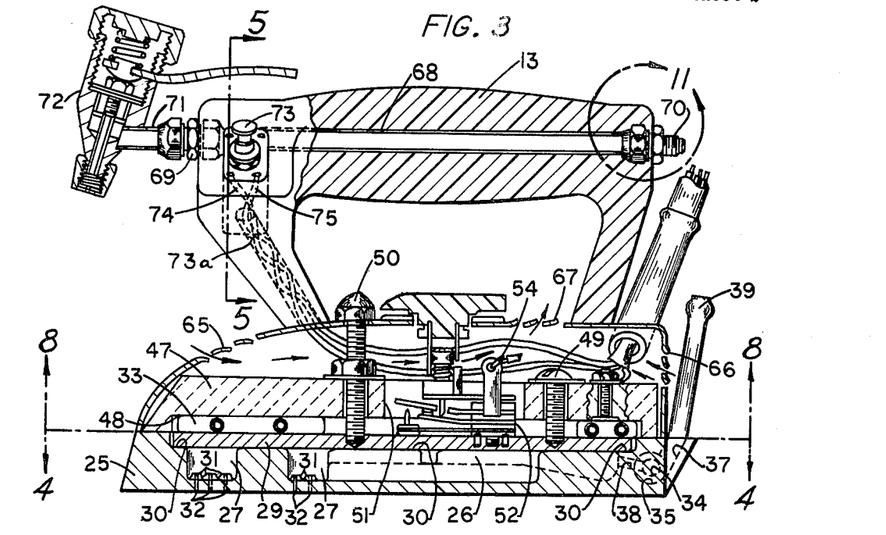
FIG. 3 is a longitudinal sectional elevation of an iron involving the invention.

The iron 10 is shown in greater detail in FIG. 3. The two piece base section 11 comprises a first or sole plate member 25 having communicating steam cavities 26, 27 and 28 (FIG. 4) therein and a second top cover member 29 sealed and secured to a shoulder 30 on the first member 25 by suitable means such as a high temperature gasket, brazing or other suitable fastening means.

Figure 4:
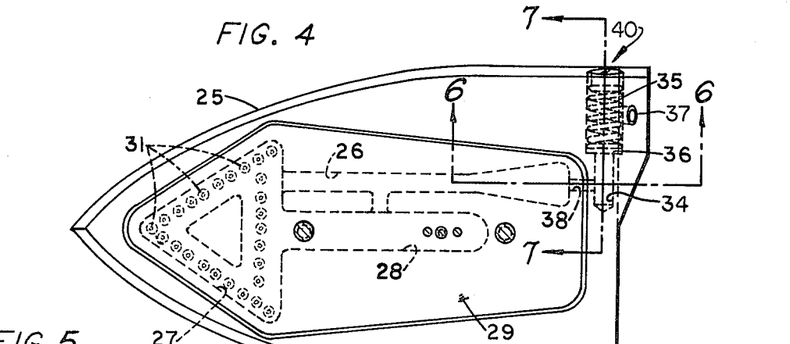
FIG. 4 is a horizontal view on line 4—4 of FIG. 3.
Figure 5:
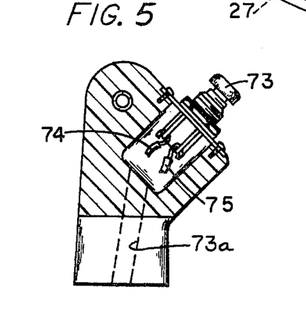
FIG. 5 is a vertical section on line 5—5 of FIG. 3.

A plurality of raised bosses 31 extend upwardly from the bottom of the steam chamber 27 and are provided with steam outlet openings 32 communicating the steam chamber 27 with the undersurface of the sole plate 25. The raised bosses 31 prevent moisture from passing out of the steam outlets 32 with the steam. The moisture condenses and is trapped on the floor of the chamber 27 until it is vaporized by heat from a heating element 33. The other steam chambers 26 and 28 also may be provided with bosses and steam outlets if desired.

The two-piece sole plate construction 25 and 29 allows the base section 11 to be made by simple casting operation and obviates the heretofore necessary expensive cored castings and/or expensive machining and drilling which were necessary to provide the required cavities and passages in the iron sole plate.

A steam inlet expansion chamber 34 is provided in the rear end of the sole plate 25 and has a counterbore 35 which is open at one end to the side of the sole plate 25 and terminates in a shoulder 36. Cross passages 37 and 38 communicate the inlet chamber 34 with a stem 39 which is connected to the steam conduit 18 and with the steam cavity 26 respectively.

Positioned within the counterbore 35 is a diffuser or filter assembly 40 (shown in detail in FIG. 7) comprising a diffuser element 41, which is urged against the shoulder 36 by an externally threaded jam nut or by a resilient means (such as the shown retainer spring) 42 retained in the counterbore 35 by a threaded plug 43 engaged with the open end of the counterbore 35. The diffuser 41 is positioned in the downstream side of the steam expansion chamber counterbore 35 and preferably under the heating element 33 to facilitate the flashing of moisture sticking to its surface and passing through it.

A manifold steam inlet with a plurality of diffuser assemblies 40 passing steam to the steam cavities in the iron can be used if desired.

Figures 6, 7, 8, 9, 10, 19:
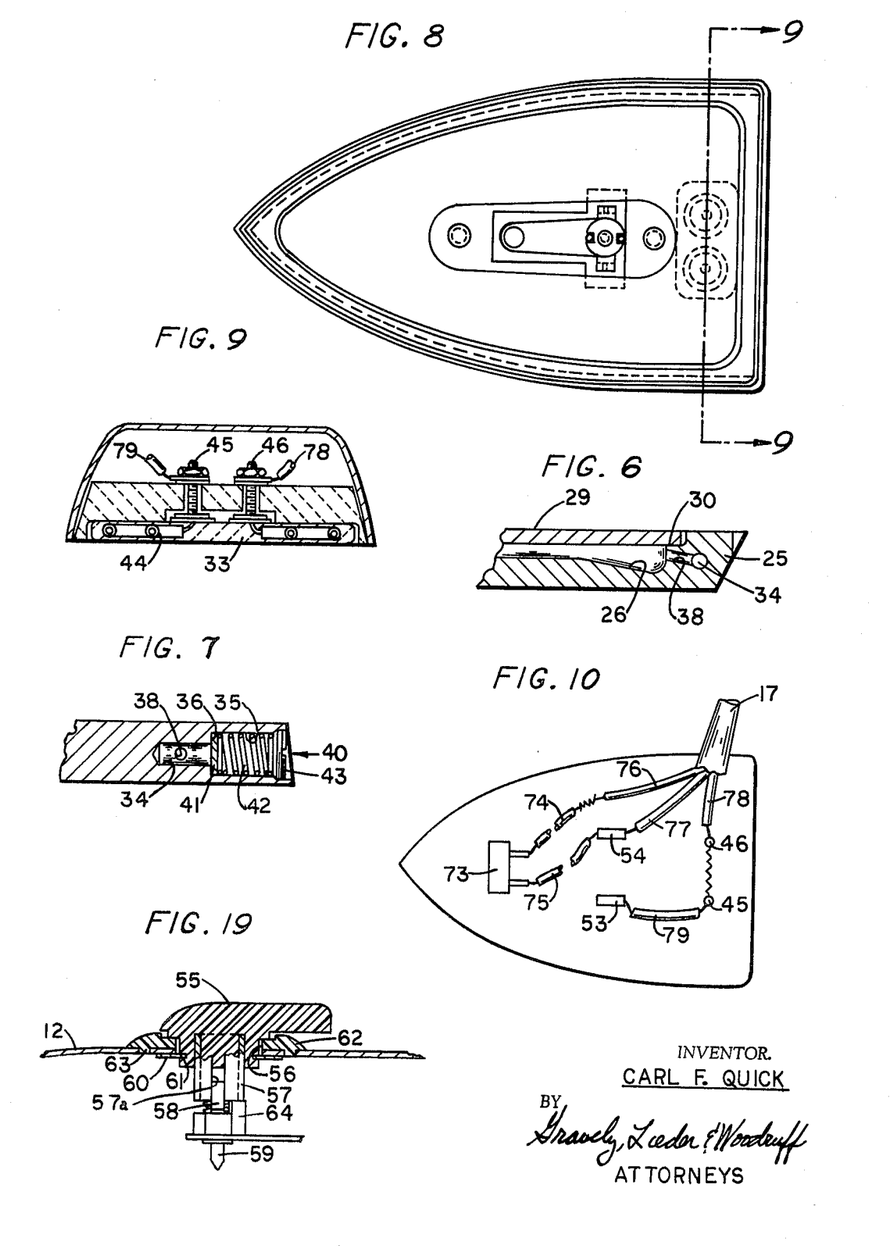
FIG. 6 is a longitudinal sectional on line 6—6 of FIG. 4.
FIG. 7 is a vertical section on line 7—7 of FIG. 4 (rotated 90° clockwise)
FIG. 8 is a horizontal section on line 8—8 of FIG. 3.
FIG. 9 is a vertical section on line 9—9 of FIG. 8 (rotated 90° clockwise)
FIG. 10 is a wiring diagram showing internal electrical connections.
FIG. 19 is an enlarged fragmentary partially broken view partly in section of the thermostat knob.

The diffuser 41 preferably is made of a porous material such as sintered powdered metal of sufficient particle size to prevent the passage of droplets of condensation while permitting the passage of steam and having a pressure drop thereacross of sufficient magnitude to flash the residual moisture which passes therethrough. The particle size of the sintered metal diffuser 41 can be varied, which in turn, will vary the dew point of the steam passing through the steam outlets 32 of the iron on to the work piece. The diffuser 41 can be from 2 microns to 0.01 inch openings, and preferably has 10–20 micron openings. Other possible diffuser materials include porous ceramic, electrodeposited metals, wire mesh, sintered fiber metals, leached metal, woven cloth or an orifice having a sufficient pressure drop to flash the water droplets. Another function of the diffuser 41 is to trap foreign matter which may be carried by the steam (such as pieces of rubber, if the conduit 18 is made of rubber) and prevent such foreign matter from passing through the steam openings 32 (which are of considerably larger size than the pores in the diffuser) onto the work object. The diffuser 41 may be reactivated when the inlet side becomes loaded with foreign matter by reversing side for side and back flushing with steam, by chemical etching, or by any other suitable cleaning method. The diffuser 41 also will break up any moisture droplets which are carried by the steam into micron sized particles which are converted to steam upon entering or striking the hot steam cavity after passing through the diffuser 41.

Since the openings in the diffuser 41 are of small size, the surface tension of the water which is trapped in the chamber 35 prevents the water from passing through the diffuser 41 until the water is pressurized. When steam enters the chamber 35, it tends to push the water through the diffuser 41 and creates a pressure drop across the diffuser 41. This pressure drop is sufficient to vaporize or "flash" the condensate passing through it. Upon passing through the diffuser 41 into the cavities 34, 38, 26, 27 and 28, the cavities act as an isothermic envelope and, being above 212° F., converts the water vapor to steam which is passed out the outlets 32.

The heating element 33 is positioned on top of the base section 11 and is of a conventional type including a resistance heater 44 having electrical terminals 45 and 46. The remainder of the electrical system will be more fully explained hereinafter.

A pressure plate 47 is provided with a recess 48 into which the heating element 33 is positioned and the pressure plate 47 is secured by fastening means 49 and 50 to the sole plate cover 29 and holds the heater 33 in engagement therewith.

The pressure plate 47 is a dielectric material of low thermal conductivity and preferably is a refractory material such as asbestos and concrete or a ceramic material. The pressure plate 47 preferably has sufficient mechanical strength itself to hold and clamp the heater 33 to the sole plate cover 29 and also is an electrical insulator for wires and connections located in the upper portion of the iron 10. Since the pressure plate 47 is a thermal insulator and encloses the top and outer periphery of the heating element 33, heat loss through conduction and radiation, upwardly and outwardly from the heating element 33 to the space between it and the iron cover 12 is minimized.

The pressure plate 47 may merely rest upon the heating element 33, if preferred, and a retaining plate can be used to hold the insulator 47 to the base section 11.

The pressure plate 47 is provided with a centrally located opening 51 into which is fitted a conventional thermostat 52 having terminals 53 and 54. The thermostat 52 is adapted to establish and interrupt current flow to the heating element 33 as will be more fully explained hereinafter.

A novel thermostat control knob 55 is fitted to a recess 56 in the iron cover 12, and includes a split bushing 57 which is cast into the knob 55 to satisfy a control key 58 which is welded to a setting screw 59 of the conventional thermostat 52. The thermostat control key 58 is located within the split 57a of the split bushing 57, and when the knob 55 is rotated, one edge of the bushing 57 presses against the key 58 which turns the setting screw 59 to set the operating temperature. A thermostat stop 64 limits clockwise and counterclockwise rotation of the knob 55. A retaining split ring 60 snaps into a molded groove 61 to retain the knob 55 and a dial 62 on the top cover 12. Molded bosses 63 on the dial 62 are located in holes punched into the cover 12 and prevent rotation of the dial 62.

The present knob assembly provides considerable economies in manufacture and assembly over present thermostat control knobs. Since the split bushing 57 is cast integrally with the knob 55, the knob 55 is coupled with the thermostat 52 by merely slipping the control key 58 into the split 57a of the bushing 57 after the dial 62 has been fitted to the cover 12. The split ring 60 then is snapped into the groove 61 to securely retain the entire assembly in position.

The iron cover 12 has vents or louvers 65 and 66 at either end thereof and a second set of vents or louvers 67 at the top thereof. Thermal turbulence caused by heat flow from the resistance heater 33 through the pressure plate opening 51 draws air into the first set of openings 65 and 66 and vents it through the second opening 67 so that a flow of cooling air (shown by the arrows in FIG. 3) is provided through the space defined by the cover 12 and the top of the pressure plate 47. This flow of cooling air allows normal electrical connections to be positioned within the housing 12 and eliminates the need for electrical standoffs and expensive ceramic insulators plus effecting considerable savings in manufacturing costs and providing more efficient operation and less discomfort to the operator.

Figure 11:
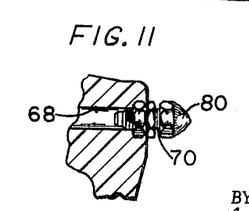
FIG. 11 is a longitudinal sectional elevation of line 11 of FIG. 3.

The handle 13 preferably is plastic and is fitted to the iron cover 12 and is provided with an integral molded water conduit 68 having molded fittings 69 and 70 at each end thereof. One of said fittings 70 is adapted to be connected to the water conduit 15 and the other of said fittings 69 is adapted to be connected to a flared conduit 71 on a conventional spray head 72. In addition to supplying water to the spray head 72, the conduit 68 (being in intimate contact with the handle 13) carries heat from the handle 13 and makes it cool to the operator's hand. FIG. 11 shows a cap 80 which can be threaded onto the molded conduit fitting 70, if the conduit 68 is not connected to a water source. A similar cap can be provided on the fitting 69 if a spray nozzle is not being used.

The handle 13 also mounts a steam control button 73 which is connected by electrical conductors 74 and 75 to the solenoid valve 20, which controls the flow of steam to the iron 10. Thus, when the button 73 is depressed the solenoid valve 20 is actuated and steam passes through the conduit 18, the stem 39, the passage 37, the counterbore 35, the filter 41, the inlet chamber 34, the passage 38, the steam cavities 26, 27 and 28 and out of the steam outlets 32.

A cavity 73a is located in the forward section of handle 13 and provides a protective conduit for the electrical wires 74 and 75.

The electrical system is shown in FIG. 10 and comprises the three wire conductor 17 which is connected to a voltage source (not shown) and includes the conductors 76, 77 and 78. The conductor 76 is joined to the conductor 74 and to one side of the solenoid valve switch 73. The conductor 77 is connected to one terminal 54 of the thermostat 52, which in turn is connected by the conductor 75 to the other side of the switch 73. Thus, when the button 73 is pushed inwardly, it establishes a circuit through the conductors 76, 74, 75 and 77 to activate the steam solenoid valve 20 to supply steam to the iron 10.

The conductor 78 is connected to one terminal 46 of the electrical resistance heater 33. The other heater terminal 45 in turn is connected by a conductor 79 to the second thermostat terminal 53. Thus when the thermostat establishes or "makes" a circuit to activate the heater 33, said circuit includes the conductor 77, the thermostat 52, the conductor 79, the heater terminal 45, the electrical resistance 44, the heater terminal 46, and the conductor 78. When the heater 33 reaches the predetermined temperature set in the thermostat 52, said thermostat "breaks" the foregoing circuit and interrupts the voltage flow to the electrical resistance 44.

Figure 12:
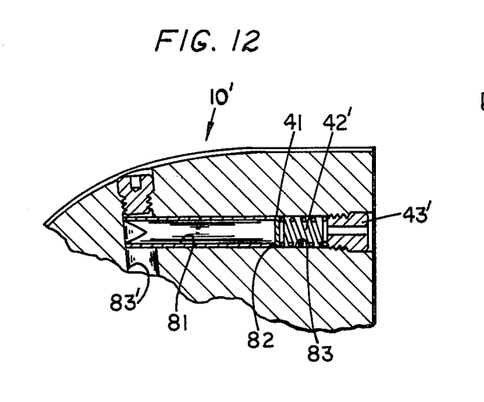
FIG. 12 is a horizontal section showing adaptor kit adapted to a conventional iron.

FIG. 12 shows an adaptor kit for use with conventional steam irons. The adaptor assembly comprises a tube 81 having one end cut off with opposed 45° faces and a shoulder 82 on the other end, a filter element 41 (as hereinbefore described), a resilient means 42' or an externally threaded jam nut, and a threaded plug 43'. In adapting a conventional iron 10', the normal steam passages 83 and 83' are utilized. The tube 81 is inserted into a steam passage 83 and its forward end with the 45° cuts is positioned in a cross chamber 83'. The tube 81 can be rotated in any direction and still will pass steam because of the tapered end. The diffuser 41 then is engaged with the tube shoulder 82 and is urged thereagainst by the plug 43' and the spring 42'. The steam is passed into the passage 83 from the steam conduit (not shown) and must pass through the filter element 41 and the tube 81 reaching the conventional steam passage 83'.

Figure 2:
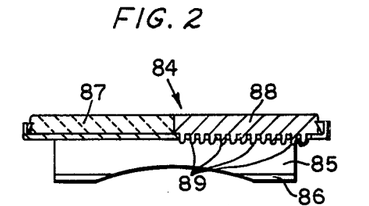
FIG. 2 is a vertical section on line 2—2 of FIG. 1 of the iron rest.

FIG. 2 shows a novel iron rest 84 comprising a frame 85, mounting feet 86 for securing the rest 84 to an ironing board, and elevated iron rest surfaces 87 and 88. The iron rest 87 is of a low thermal conductivity material (such as an asbestos base material) which prevents excessive heat losses when the iron is rested upon its surface. The iron rest 88 is of a high thermal conductivity material (such as aluminum) to rapidly conduct heat from the undersurface of the iron to cool the same. The upper or iron engaging surface of the rest 88 is flat and smooth to better its contact with the iron undersurface and cooling fins 89 are provided on the bottom surface thereof to aid in dissipating heat from the iron, thus promoting rapid cooling thereof.

As mentioned, the thermal insulating plate 47 retards heating of the air and the electrical wiring and connections located within the cover 12. The plate 47 also reduces the power consumption of the heating element 33 by a factor of 31% in actual operating tests. The present iron used 31% less kilowatt hours of power than a conventional iron to maintain the same temperature.

Also, the insulating plate 47 reduces the number of cycles of the thermostat by 50%. In a 72 minute test, the thermostat in an iron embodying the present invention "made and broke" circuit 13 times as compared to the 26 times of the thermostat in a conventional iron set at the same temperature. Thus the life of the thermostat is increased by 100%.

Figures 14, 15, 16:
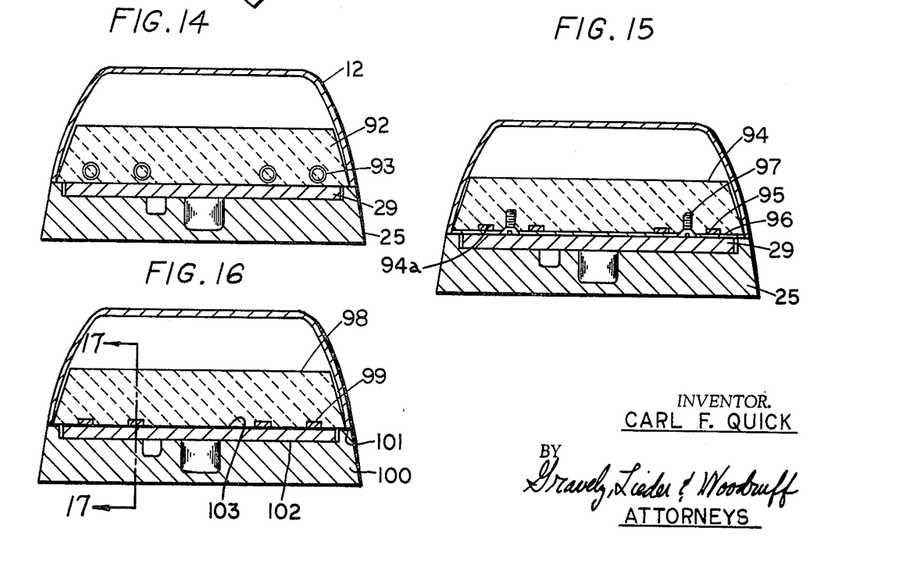
FIG. 14 is a sectional view taken along line 14—14 of FIG. 13.
FIG. 15 is a sectional view of a further modification of the present invention, also taken along a line similar to line 14—14 of FIG. 13.
FIG. 16 is a sectional view of another modification of the present invention, also taken along a line similar to line 14—14 of FIG. 13.

FIG. 14 shows a modification of the pressure plate and heating element wherein a refractory block 92 has a heating element 93 cast integrally therein and the block 92 rests directly upon the sole plate 25 and cover 29. The construction shown in FIG. 14 eliminates the separate pressure plate and also the conventional metal housing which tends to dissipate heat from the top of the heating element. The block 92 has sufficient mechanical strength to be self supporting without additional support means.

When the block 92 is made from ceramic materials which cure below 900° F., such as calcium-aluminate cement, sodium silicate aggregate, and phosphoric acid bonded aggregate, about 5% of a radiant heat barrier, such as expanded mica, or potassium titanate fibers, are added to form a block 92 in which the radiant heat losses ar reduced by 90%.

Castable extrudable materials, such as $Al_2O_3$, $ZrO_2$, $SiO_2$, MgO, etc., or combinations thereof, may be utilized to construct the heating element thermal insulation body 92. The heating elements 93 are located as close as possible to one surface to facilitate rapid heat transfer to the sole plate 25 and cover plate 29. The greater mass of thermal insulation material is located directly above the heating element 93, thereby reducing the heat losses into the chamber formed by cover 12. This also improves the efficiency of the iron, reduces the initial heat up time from ambient to 50%. It also reduces the number of make-break cycles of the thermostat and allows the air that is drawn into the chamber formed by the cover 12 to dissipate the heat therein through the vents 65, 66 and 67 as it is generated. The electrical terminals 45 and 46 are connected to the resistance heating element 93.

FIG. 15 shows another variation of the block and heating element assembly wherein a thermal and dielectric insulating block 94 is provided with recess 94a in the lower surfaces thereof and a strip heater 95 is positioned within said recesses 94a. A thin flat electrical insulator 96 is secured to the block 94 by fastening means, such as the screws 97, and retains the heater 95 in the block 94 as well as electrically insulating the heater 95 from the sole plate 25 and the cover 29.

The insulator 96 may be approximately a 5 mil thick sheet of $Al_2O_3$, $SiO_2$, or the like. The insulator 96 also may be cloth insulator, such as mica cloth, leached $SiO_2$ cloth, or the like, of approximately 2 mil thickness. In other respects, the construction shown in FIG. 15 has the same advantages as the structure shown in FIG. 14, and in particular, the number of interfaces, i.e., the zones between dissimilar materials through which the heat must pass to reach the sole plate, are reduced to two. The efficiency of heat transfer is lowest at an interface, and thus elimination of interfaces raises the efficiency of heat transfer.

Figure 17:
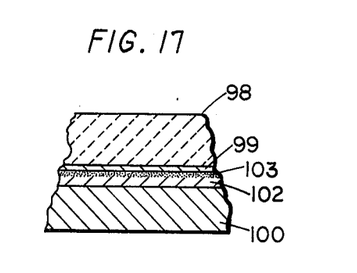
FIG. 17 is a fragmentary view of the modification shown in FIG. 16.

The modifications shown in FIGS. 16 and 17 utilize a dielectric block 98 of high thermal resistivity and good mechanical strength as hereinbefore described which has a strip resistance heater 99 recessed in the lower face thereof. The sole plate 100 is of aluminum, titanium, or beryllium and has the upper surface thereof anodicly oxidized (preferably by sulfuric acid or the hard coat processes) to produce approximately a 0.4 to 5 mil thick layer 101 of hard dense aluminum oxide ($Al_2O_3$), titanium dioxide or beryllium oxide respectively. Similarly, the cover plate 102 is of aluminum, titanium or beryllium and has a hard dense anodized layer 103 of the respective oxide on the upper surface thereof.

At the present because of economies, aluminum is the preferred material for making the sole plate 100 and the cover plate 102.

Even though the heating element 99 is in direct physical contact with the upper surface of the sole plate 100 and cover 102, the metal in the sole plate 100 and cover 102 is electrically insulated by the anodized surface layers of oxide 101 and 103. The layers 101 and 103 are of sufficient dielectric strength and electrical resistivity to prevent shorting of the heating element 99.

Since the layers 101 and 103 are intimately bonded to the sole plate 100 and the cover plate 102 respectively and since the heating element 99 directly touches the sole plate upper surface 101 and the cover plate upper surface 103, there is only one interface through which heat must pass in going from the heater 99 to the sole plate 100. Thus heat transfer efficiency is improved considerably.

Another advantage of the foregoing modification is the substantial reduction in costs effected by the elimination of a separate dielectric material between the heating element 99 and the sole plate 100 and the cover 102. The savings runs into several hundred percent over conventional manufacturers.

The electrical insulating layers 101 and 103 may be deposited on the sole plate 100 and the cover plate 102 by flame spraying, by brush coating, etc. The dielectric layers 101 and 103 also may be made from air or oven cured ceramics, such as calcium aluminate cement, sodium silicate aggregate, a flame spray of $Al_2O_3$, $SiO_2$, etc. When these techniques and materials are used, the dielectric layer can be applied directly to the undersurface of the block 98 and the heater 99. Also, the sole plate 100 and the cover 102 need not be aluminum, titanium, or beryllium if the anodizing process is not utilized.

Another modification which has important economic and convenience advantages is to apply a printed circuit to the block 98 by any known method, such as vapor deposit, electroplate using metalizing and plating over, or a conductive ink, and electroplating over the conductive ink. The heating element 99 is eliminated, although a dielectric material still must be positioned between the circuit and the the sole plate and cover plate. The printed circuit has resistance portions therein which heat up when voltage is applied and in turn heat up the sole plate.

Figure 13:
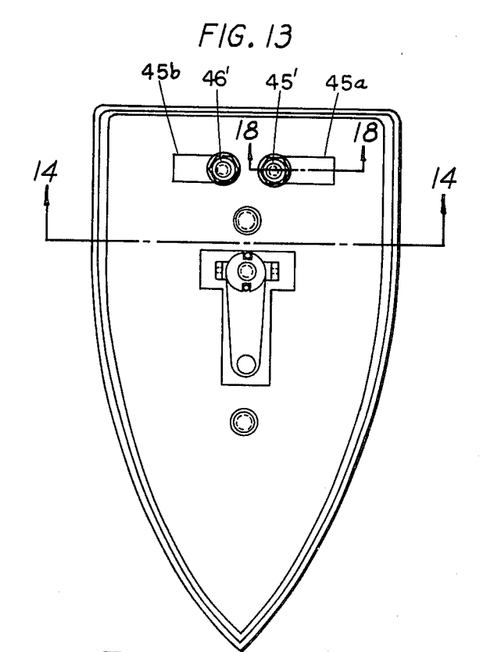
FIG. 13 shows plan view of a modified insulated heating element and sole plate.
Figure 18:
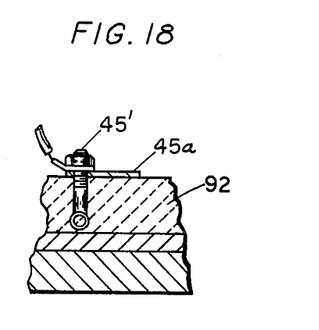
FIG. 18 is a fragmentary view of the terminal shown in FIG. 13.

FIGS. 13 and 18 show a heat sink used to dissipate heat and to connect the heating elements 93 to the current leads. The terminals 45' and 46' pass through the block 92 and have large copper bars 45a and 45b at the top thereof to rapidly conduct heat from the terminals 45' and 46'.

Figure 20:
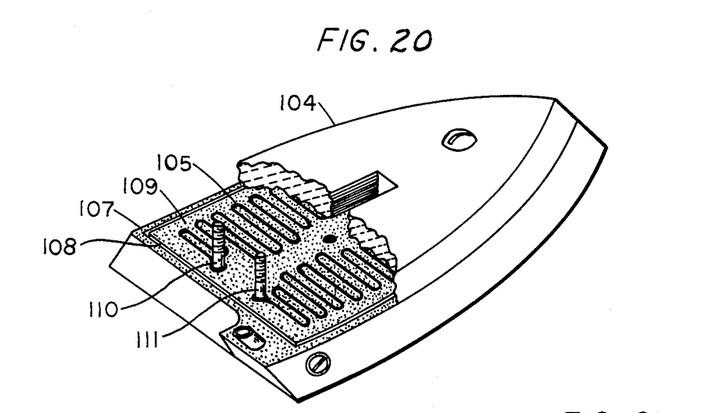
FIG. 20 is a partially broken perspective view of a modification of the present invention.
Figure 21:
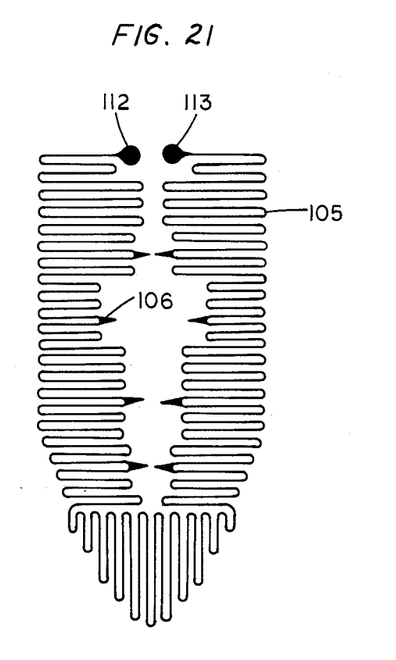
FIG. 21 is a plan view of the heating element shown in FIG. 20.
Figure 22:
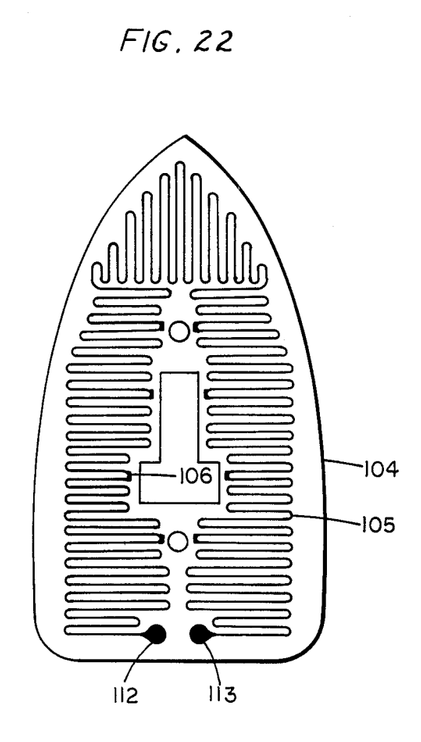
FIG. 22 is a view of the undersurface of the heating element and the dielectric high thermal resistive pressure plate of FIG. 20 showing the prongs of the heating element bent upwardly and secured in the pressure plate.

FIGS. 20, 21 and 22 show a further modification of the present invention comprising an insulating pressure plate 104 and a flat thin heating element 105 made of 304 stainless steel or other suitable metals of sufficient resistivity.

The heating element 105 is provided with a series of retaining barbs 106 adapted to be bent upwardly and positioned in the undesurface of the pressure plate 104 to secure the heating element 105 firmly in a fixed position against the undersurface of the plate 104 (FIG. 22).

The sole plate 107 and cover member 108 each have a coating of a dielectric material 109 thereon approximately 0.4 to 5 mils thick. The dielectric coating may be an anodic or flame spray coating of a material such as aluminum oxide, zirconium oxide, magnesium oxide, silicon oxide or aluminum-magnesium oxide, etc. or combinations thereof. If the sole plate and cover member are aluminum, titanium, or beryllium the top surfaces thereof may be anodized as hereinbefore explained.

Stud connectors 110 and 111 are flash welded or otherwise attached to the terminal points 112 and 113 of the heating element 105. The studs 110 and 111 pass through the pressure plate 104 and are connected to a suitable power source.

FIG. 21 also shows the sharp anchors 106 which are formed 90° to the heating element 105 and are staked into the thermal insulating material 104 to retain the heating element position for assembly and to prevent movement thus preventing accidental shorting against thermostat 52 or pressure plate fastening means 49 and 50.

Conventional heating elements utilize twisted Nichrome wires having a dielectric coating with a sheath around the coated wires. Not only are the Nichrome wires expensive, but the fabrication and cost of the heating element is considerable. The Nichrome wires are used because conventional steel oxidizes at about 900° F. and the heating element of a conventional iron has to heat to between 1200 and 2000° F. in order to achieve an equilibrium temperature on the operating surfaces of the sole plate of about 575° F. which is the top thermostat setting. The present invention utilizes a flat steel heating element 105 which for the disclosed modification is 0.043 inch wide by 0.005 inch thick by 9 feet long as shown in FIG. 21. The heating element 105 has a total contact area against the sole plate 107 and cover 108 of 4.744 square inches. The present flat steel heating element 105 not only is made from less expensive material than conventional elements, but can be simply manufactured by blanking out on a punch press. The element 105 preferably is made from the 300, 400 or 500 series of stainless steel, and may be stamped from a flat sheet or made of wire wound in a flat plane.

Since the heating element 105 is separated from the sole plate 107 and the cover 108 only by a thin dielectric coating 109, there is only a small heat barrier and the heating element 105 and the sole plate 107 and the cover 108 come to an equilibrium temperature almost immediately. Thus the heat losses are lessened, so that the heating element does not reach a temperature above 700–850° F., which is considerably below the oxidation temperature of a steel heating element. If the sole plate 107 and the cover 108 are aluminum and the dielectric layer 109 is anodized, the heating element 105 does not go above 700° F. during operation of the iron.

For purposes of comparison, a conventional steam iron was heated from ambient temperature to the maximum of 575° F. in 6.74 minutes. The modification shown in FIGS. 1–12 (utilizing a conventional heating element with the improved insulating dielectric pressure plate) reaches equilibrium temperature of 575° F. in 3.4 minutes. However, the modification shown in FIGS. 20, 21 and 22 (utilizing a stainless steel heating element and a 1½ mil dielectric layer of refractory 109 atop an aluminum sole plate 107 and an aluminum cover plate 108), reached equilibrium temperature of 575° F. in 0.96 minute. Thus, the present modification heats seven times as fast as a conventional steam iron.

In addition to steel, the heating element 105 can be any suitable metal or alloy material which oxidizes above about 850° F. and which has suitable resistivity to generate sufficient heat when an electrical current is applied thereto. An example is plated common steels such as the 1000 series steels which have been nickel or silver plated. Another example is silver or nickel plated copper.

The foregoing described inexpensive steel heating element and thin film dielectric coating, such as flame spray and anodic coated surfaces etc., also can be used in conventional electric irons as well as the shown steam iron.

The pressure plate 104 needs only minimum mechanical strength, since it is not supporting any load. However, the pressure plate 104 should have good heat insulating and dielectric properties.

Although the base member has been represented as being of two-piece construction, it may be made in one piece, if the maker wishes to utilize the benefits of the present invention in regard to low heat loss, short heat-up time, inexpensive heating element, and ease of applying dielectric and heat insulating layers, and still incur the added expense of drilling and core casting the base piece. Similarly an anodic or flame spray coating can as well be applied to a one-piece base plate as to a two-piece base plate.

Also, any of the modifications can be fabricated from an aluminum, titanium or beryllium base plate with the dielectric coating being applied by flame spraying rather than anodizing, if preferred.

Thus it is seen that the present invention provides a steam iron which achieves all of the novel objects and advantages sought therefor.

This invention is intended to cover all changes and modifications of the examples of the invention herein chosen for purposes of the disclosure, which do not constitute departures from the spirit and scope of the invention.

What is claimed is:

1. An adaptor assembly for a steam iron having steam passages therein, comprising a tube adapted to be inserted into a first steam passage in said iron, said tube defining a shoulder at one end and having its other end adapted to pass steam to a second cross steam passage in said iron, a diffuser element adapted to seat against said shoulder, said diffuser element having a pressure drop thereacross and openings therein from about 2 microns to about 0.01 inch in size passing therethrough, and a resilient retaining means urging said diffuser against said shoulder.

2. A steam iron comprising a cover, a sole plate provided with a steam cavity therein and having steam outlets communicating said cavity with the undersurface of said sole plate, said cavity being maintained above 212° F., a steam inlet, a diffuser element positioned between said inlet and said steam cavity, said diffuser element having openings therein from about 2 microns to about 0.01 inch in size, a heating element positioned above said steam cavity, a dielectric refractory coating on the upper surface of said sole plate, said heating element being in intimate contact with said dielectric coating, and a dielectric pressure plate of high thermal resistivity positioned above said heating element, said pressure plate insulating the chamber defined by said cover from said heating element, said diffuser element permitting the passage of steam, but blocking the passage of condensate and foreign matter, steam pressure on said condensate forcing said condensate through said diffuser openings into said steam cavity, said condensate being vaporized by the pressure drop across said diffuser, said vapor being converted to steam by the isothermic envelope effect of said steam cavity, the dew point of said steam being variable by varying the size of said diffuser openings.

3. A steam iron comprising a sole plate provided with a steam cavity therein and having steam outlets communicating said cavity with the undersurface of said sole plate, a steam inlet, a diffuser element positioned between said inlet and said steam cavity, said element having openings therein from about 2 microns to about 0.01 inch in size, and a heating element positioned in close proximity to said diffuser element to heat said diffuser element whereby moisture striking said element is converted to steam.

4. A steam iron comprising a sole plate provided with a steam cavity therein and having steam outlets communicating said cavity with the undersurface of said sole plate, a steam inlet, a diffuser element positioned between said inlet and said steam cavity, said element having openings therein from about 2 microns to about 0.01 inch in size, a cover fastened to the sole plate, a heating element positioned adjacent to the top surface of said sole plate, and a pressure plate positioned between said heating element and said cover and securing said heating element to said sole plate, said pressure plate being of a dielectric material of low thermal conductivity and having good mechanical strength, said cover being provided with a first opening at the outer periphery thereof adjacent to the sole plate juncture and a second vent opening at the top thereof, said vents providing a heat induced turbulent air flow through said cover to draw heat away from the top of said pressure plate.

5. A steam iron comprising a sole plate provided with a steam cavity therein and having steam outlets communicating said cavity with the undersurface of said sole plate, a steam inlet, a diffuser element positioned between said inlet and said steam cavity, said element having openings therein from about 2 microns to about 0.01 inch in size, a cover secured to said sole plate, a heating element positioned adjacent to the top surface of said sole plate, and a pressure plate positioned between said heating element and said cover, said pressure plate being of a dielectric material of low thermal conductivity, and good mechanical strength, said pressure plate maintaining said heating element against said sole plate, said pressure plate being provided with an opening therein, and a thermostat positioned in said opening and connected to said sole plate, said low thermal conductivity pressure plate reducing the temperature gradient on the working face of sole plate and reducing heat losses through the pressure plate, thereby reducing the number of circuit making and breaking cycles experienced by said thermostat.

6. A steam iron comprising a sole plate provided with a steam cavity therein and having steam outlets communicating said cavity with the undersurface of said sole plate, a steam inlet, a diffuser element positioned between said inlet and said steam cavity, said element having openings therein from about 2 microns to about 0.01 inch in size, a cover secured to said sole plate and having an opening therein, and a thermostat and knob assembly comprising a selector knob having an enlarged head and a shank portion, an indicator or dial, a split bushing integral with said knob and extending downwardly from the end of said shank portion, a key connected to the thermostat temperature control mechanism and fitted to the split in said bushing, said knob shank being positioned in said cover opening with the knob head being positioned outwardly of said dial and iron cover, said shank having an opening therin below the undersurface of said cover, and retaining means adapted to engage said shank opening to retain said knob to said cover.

7. A steam iron comprising a cover, a sole plate provided with a steam cavity therein and having steam outlets communicating said cavity with the undersurface of said sole plate, a steam inlet communicating with said steam cavity, a heating element positioned above said steam cavity, means electrically insulating the heating element from the upper surface of said sole plate, said heating element being in intimate contact with said means, and a dielectric pressure plate of low thermal conductivity and good mechanical strength positioned against said heating element to urge the heating element into engagement with said insulating means, said pressure plate also insulating the chamber defined by said cover from said heating element, said pressure plate being provided with an opening therein, and a thermostat positioned in said opening and connected to said sole plate, said low thermal conductivity pressure plate reducing the temperature gradient on the working face of the sole plate and reducing heat losses through the pressure plate, thereby reducing the number of circuit making and breaking cycles experienced by said thermostat.

8. A steam iron comprising a cover, a sole plate provided with a steam cavity therein and having steam outlets communicating said cavity with the undersurface of said sole plate, a steam inlet communicating with said steam cavity, a heating element positioned above said steam cavity, a dielectric refractory coating on the upper surface of said sole plate, said heating element being in intimate contact with said dielectric coating, and a dielectric pressure plate of high thermal resistivity positioned above said heating element to urge the heating element into engagement with said refractory coating, said pressure plate also insulating the chamber defined by said cover from said heating element.

9. A steam iron comprising a cover, a sole plate provided with a steam cavity therein and having steam outlets communicating said cavity with the undersurface of said sole plate, said cavity being maintained above 212° F, a steam inlet, and a diffuser element positioned between said inlet and said steam cavity, said diffuser element having openings therein from about 2 microns to about 0.01 inch in size, a heating element positioned adjacent to said steam cavity, said diffuser element permitting the passage of steam, but blocking the passage of condensate and foreign matter, steam pressure on said condensate forcing said condensate through said diffuser openings into said steam cavity, said condensate being vaporized by the pressure drop across said diffuser, said vapor being converted to steam by the isothermic envelope effect of said steam cavity, the dew point of said steam being variable by varying the size of said diffuser openings.

10. The structure of claim 9 wherein the diffuser element is of sintered metal.

11. A steam iron comprising a sole plate cover, a steam inlet, a two-piece sole plate, one of said pieces being provided with an open sided steam cavity therein communicating with the steam inlet and having steam outlets communicating said cavity with the undersurface of said sole plate, the other of said pieces being positioned over said cavity forming a cover therefor, mean fastening the two pieces together, a heating element positioned adjacent to the cover piece and immediately above said steam cavity to maintain the cavity heated, a dielectric refractory coating on the upper surface of the sole plate cover piece to electrically insulate the heating element from the upper surface of said sole plate cover piece, said heating element being in intimate contact with said coating, and a dielectric pressure plate of high thermal resistivity positioned above said heating element, said pressure plate insulating the chamber defined by said cover from said heating element.

References Cited by the Examiner

UNITED STATES PATENTS

| | | | |
|---|---|---|---|
| 1,537,916 | 5/1925 | Black | 38—77 X |
| 1,617,755 | 2/1927 | Gott | 38—77 X |
| 1,847,808 | 3/1932 | Beavan | 38—96 |
| 1,942,579 | 1/1934 | Sussman | 38—77 |
| 2,059,620 | 11/1936 | Abrams et al. | 38—77 |
| 2,078,061 | 4/1937 | Cooper | 38—77 |
| 2,602,704 | 7/1952 | Richterkessing et al. | 38—78 X |
| 2,602,873 | 7/1952 | Finlayson | 219—25 |
| 2,622,171 | 12/1952 | Hiltenbrand | 200—138 |
| 2,634,525 | 4/1953 | Levine | 38—77 |
| 2,658,293 | 11/1953 | Weeks | 38—96 |
| 2,666,998 | 1/1954 | Dafforn et al. | 38—77 |
| 2,699,479 | 1/1955 | Gorham | 200—138 |
| 2,815,593 | 12/1957 | Reimers et al | 38—77 |
| 2,817,169 | 12/1957 | Schott | 38—78 |
| 2,901,584 | 8/1959 | Finlayson | 219—25 |
| 2,973,833 | 3/1961 | Cook | 55—523 X |
| 3,059,393 | 10/1962 | Allred | 55—523 X |

JORDAN FRANKLIN, *Primary Examiner.*

THOMAS J. HICKEY, RUSSELL C. MADER,
*Examiners.*